United States Patent [19]

Birchall et al.

[11] 4,005,172

[45] Jan. 25, 1977

[54] SOLID COMPLEX PHOSPHATE OF ALUMINUM

[75] Inventors: James Derek Birchall; John Edward Cassidy, both of Runcorn, England

[73] Assignee: Imperial Chemical Industries Limited, London, England

[22] Filed: Oct. 21, 1974

[21] Appl. No.: 516,778

Related U.S. Application Data

[60] Division of Ser. No. 274,964, July 25, 1972, Pat. No. 3,870,737, and a continuation of Ser. No. 42,499, June 1, 1970, abandoned.

[30] Foreign Application Priority Data

June 12, 1969 United Kingdom ............ 29862/69

[52] U.S. Cl. ................................ 423/300; 423/305
[51] Int. Cl.$^2$ ......................................... C01B 25/10
[58] Field of Search ........................... 423/300, 305

[56] References Cited

OTHER PUBLICATIONS

Chemical Abstracts, vol. 55, 23385h, 1961.

*Primary Examiner*—Oscar R. Vertiz
*Assistant Examiner*—Gregory A. Heller
*Attorney, Agent, or Firm*—Cushman, Darby & Cushman

[57] ABSTRACT

Complex phosphates of aluminum containing a halogen and chemically-bound molecule of a hydroxy compound, namely, water. A typical example is a complex phosphate having the empirical formulate $AlPClH_{11}O_9$. They are most conveniently prepared by the reaction of an aluminum halide with water and orthophosphoric acid, under relatively cool conditions. The compounds are generally soluble in water and polar organic solvents. They decompose at low temperatures to give aluminum orthophosphate, thereby providing a method for producing aluminum phosphate in many forms, for example, fibers, coatings, binders and fine particles, from a solution in water or organic solvents.

7 Claims, No Drawings

SOLID COMPLEX PHOSPHATE OF ALUMINUM

This is a division, of application Ser. No. 274,964, filed on July 25, 1972, and now U.S. Pat. No. 3,870,737 and a continuation of Ser. No. 42,499 now abandoned.

This invention relates to novel phosphates and to their preparation, and in particular to complex phosphates of aluminium. We have found that certain complex phosphates of aluminium are especially useful for preparing fibres, coatings, binders and fine particles of aluminium phosphate.

According to the present invention there is provided halogen-containing complex phosphates of aluminium containing at least one chemically-bound molecule of a hydroxy compound R-OH wherein R is a hydrogen atom.

The halogen in the halogen-containing complex phosphate of aluminium is preferably chlorine, but the compounds may contain other halogens, for example bromine or iodine.

The ratio of the number of gram atoms of aluminium to the number of gram atoms of phosphorus in the complex phosphates of aluminium may vary over a wide range, for example from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of the invention may be monomeric or polymeric.

The structure of the complex phosphates is not fully understood and some of the chemically-bound hydroxy compounds may be bound as groups - OR rather than as complete molecules.

The monomeric forms, or the repeating units of the polymeric forms of the complex phosphates, may contain, for example, from one to five molecules of the hydroxy compound. Most frequently the number of molecules of the hydroxy compound is 4. In some cases the complex phosphates may contain molecules of different hydroxy compounds, for example they may contain both chemically-bound water and a chemically-bound organic hydroxy compound, the total number of such molecules being, for example, from 2 to 5.

An example of a complex phosphate containing chemically-bound water is the complex phosphate containing chemically-bound water having the empirical formula $AlPClH_{11}O_9$. The infra-red and X-ray characteristics of the compound are as hereinafter described. This compound is designated aluminium chloro-phosphate hydrate, for convenience referred to as ACPH, but it is to be understood that this designation in no way implies any particular molecular structure for the compound.

Complex phosphates containing chemically-bound water molecules are soluble in water. Their solubility in solvent mixtures increases as the proportion of polar solvent in the solvent mixture increases. Solvents comprising water and a water-miscible organic solvent are especially convenient for dissolving the complex phosphates. Solubility generally increases as the pH of the solution is decreased, and it is preferable to establish a pH of less than 2.5 in water solutions to maintain maximum solubility. The compounds of the invention generally give viscous solutions in water.

The complex phosphates of the invention may be prepared, for example, by reacting aluminium or an aluminium compound, preferably a halide, with a hydroxy compound R-OH and phosphoric acid, a phosphoric acid ester or a compound capable of forming phosphoric acid or a phosphoric acid ester. The aluminium halide may be a simple halide or an oxyhalide or an aluminium alkoxy halide, for example aluminium ethoxy chloride. Other suitable aluminium compounds include aluminium alkoxides, for example aluminium ethoxide. When aluminium or an aluminium compound other than a halide is used, the presence of a halogen acid is necessary. Substances capable of forming phosphoric acid or a phosphoric acid ester include phosphorus pentoxide, phosphorus oxyhalides and phosphorus halides. An aqueous solution of phosphoric acid may be used, conveniently an 88% solution in water.

The order in which the reactants are added to one another is not critical; we prefer to add the aluminium compound to the hydroxy compound and then to react the phosphoric acid or phosphoric acid ester with the resultant mixture.

The highest yields of product are obtained when the molar ratio of aluminium to phosphorus in the reaction is substantially 1:1.

The reaction may be carried out over a wide range of temperature, but generally we prefer to use a temperature below 60° C and preferably from 0° C to 50° C, to obtain optimum yields.

Complex phosphates according to the invention containing chemically-bound water molecules or a mixture containing the said complex phosphate may also be prepared by the hydrolysis of another complex phosphate which contains a chemically-bound organic hydroxy compound. It is especially convenient to use as starting material the complex phosphate having the empirical formula $AlPClH_{25}C_8O_8$. Hydrolysis may be effected by any convenient means, but for many of the compounds of the invention it is sufficient to add water at room temperature or to keep the compounds in contact with moist air for a sufficient time. Conveniently this is done by fluidising the compound in a stream of humidified air, preferably at a temperature below 80° C.

A solid comprising the complex phosphate may be separated from the reaction mixture and used as such or optionally further purified before use. Separation of the product may be effected by any convenient means, for example by precipitation by cooling, evaporation of volatile constituents or addition of a further component, followed by filtration or by chromatography. In some cases spontaneous precipitation of the product from the reaction mixture occurs, and separation is effected simply by filtration. The mother liquor left after separation of the product may be discarded or recycled for further use, preferably after purification from unwanted side-products of the reaction.

The complex phosphates according to the invention decompose on heating to give aluminium phosphate in amorphous or various crystalline forms. The temperature at which aluminium phosphate forms depends upon the particular complex phosphate heated, but is normally from 80° C to 500° C, and is often below 100° C. It is convenient to heat the complex phosphate to a temperature from 100° C to 150° C to form aluminium phosphate. Surprisingly, crystal forms of aluminium phosphate can be obtained at low temperatures which are normally obtained only by heating aluminium phosphate to temperatures in excess of 800° C. The aluminium phosphate may be further heated, for example to change its crystalline form. When the gram atom ratio of aluminium to phosphorus in the complex phosphate is 1:1 the aluminium phosphate produced has the same ratio of aluminium to phosphorus and is consequently particularly chemically stable.

The invention this provides a method for producing aluminium phosphate in many desirable forms at low temperatures, conveniently from solutions of the complex phosphates in water. The complex phosphates of the invention are therefore especially useful in providing means for producing, for example, formed bodies, coatings and binders comprising aluminium phosphate. The properties of aluminium phosphate are such as to confer on these materials desirable properties such as strength, refractoriness or chemical inertness.

Solutions of complex phosphates may conveniently comprise additional components, for example materials which will aid the further processing of the solutions or desirably affect the products formed from the solutions. Thus organic materials, especially polymers, may be dissolved in the complex phosphate solution. Additional components, for example pigments, colorants or fillers, may likewise be dispersed in the solutions of the complex phosphates. It is especially preferred that the solution of complex phosphate comprises a material or materials which control the physical nature of the solid phase of aluminium phosphate which is produced from the solution, for example by heating. When the solvent comprises water it is preferred to use a crystallisation stabiliser, for example finely divided silica or alumina, or a nucleation activator or catalyst, for example dibutyl peroxide, or calcium, magnesium or sodium chloride.

Solutions of the complex phosphates, especially aqueous solutions, are viscous, so that fibres may be prepared from them by one of the usual fiberising processes such as drawing, blowing, extrusion through a spinneret or centrifugal spinning. It is preferred for the solution to have a viscosity from 20 to 5000 poise, more preferably a viscosity from 200 to 3000 poise.

The fibres may be dried by, for example, subjecting them to a vacuum and/or heating, usually to a temperature from 20° C to 100° C and they may be used in the dried form in, for example, a composite material, or they may be heated, preferably to a temperature of greater than 100° C, more preferably to a temperature of 100° C to 500° C, to produce a chemically-inert fibre. The duration of heating is preferably from 10 minutes to 1200 minutes. Drying under vacuum may be omitted in cases where the fibres are heated.

It is advantageous to apply tension to the fibre during the spinning stage to achieve a greater degree of orientation of the crystallites in the fibre. Tension may also be applied to the fibre with advantage while it is heated.

The fibres so produced may conveniently have mean diameters from 1 micron to 25 microns; it is preferred that the fibres be produced at a mean diameter of less than 10 microns. In cases where the fibre is heated to a temperature greater than 100° C after fiberising, and starting compounds have a gram atom ratio of aluminium to phosphorus of unity, the said fibre comprises aluminium phosphate having a similar gram atom ratio of aluminium to phosphorus and which is either in the amorphous form or in one of its crystalline modifications, Berlinite, Tridymite or Cristobalite. Fibres which have been heated to a temperature greater than 100° C may be subjected to a temperature greater than the melting point, for example, by passing them through a plasma torch and cooling them rapidly to produce a vitreous form of fibre.

Orientation of the crystallites in the fibre may be increased by drawing the fibre during spinning.

The solutions of the complex phosphates may be filtered, for example through a microporous filter, before fibres are formed from them, so that adventitious nuclei may be removed and prevented from affecting the crystallisation of the aluminium phosphate. Additives for controlling crystallisation of aluminium phosphate from aqueous solutions of the complex phosphates may be employed as hereinbefore described.

Various additives may be incorporated in the fibres, for example by adding them to the solution from which the fibres are formed. Examples of additives which may with advantage be so used are a. grain growth inhibitors, for example fine magnesium oxide or aluminium oxide,
b. fine aluminium phosphate,
c. phase change stabilisers,
d. reinforcing particles such as silica or graphite, and
e. crystallisation suppression agents for example colloidal silica.

The inorganic fibres are thermally stable, usually to at least 1600° C, and are chemically inert and may be used as refractory insulation or, in their strong forms, as reinforcing fibres for resins, metals such as aluminium, ceramics, fired clay-ware and glass.

Solutions of the complex phosphate in water may be used to produce coatings of aluminium phosphate for a number of surfaces, by removal of solvent and preferably heating of the deposited coating. The duration of heating is preferably at least 10 minutes. The form of aluminium phosphate produced will depend, amongst other things, upon the temperature to which the coating is heated, although a temperature of at least 80° C is normally sufficient to form a coat of aluminium phosphate. Preferably the coating is heated to a temperature from 100° C. The coating may be further heated to polymerise the deposit or to change the crystal form of aluminium phosphate. Organic materials, preferably polymers, may be dissolved in the solutions from which the coatings are produced to give coatings comprising an organic material and aluminium phosphate. It is advantageous to add a suitable wetting agent to the coating solution to assist uniform coating. Other components, for example pigments, may be incorporated in the coating by including them in the coating solution.

The invention therefore provides a method for coating any substrate, for example glass, carbon, metals, ceramics or organic polymers, with a heat-stable, inert, transparent, hard film of aluminium phosphate. It is preferable for the substrate to be capable of withstanding a temperature of at least 80° C; for substrates which will not withstand this temperature, the coating is preferably heated by a method which does not heat the surface on which it is deposited, for example, by microwave heating. The coating of aluminium phosphate is useful in a number of ways, for example protection of the substrate against corrosion, heat, or abrasion. Any desired shape of substrate surface may be coated, for example fibres, films, powdered and manufactured objects. Surfaces coated with aluminium phosphate may be coated with a further component, for example with a metal such as aluminium.

Solutions of the complex phosphates are especially useful for coating glass since bonding between the glass surface and aluminium phosphate is very good. It is especially advantageous if the coating is applied immediately the glass is formed from its melt. The sizing of glass fibre by means of solutions of the complex phosphates is particularly useful. The solution is preferably applied to the glass fibre immediately after the fibre is extruded. After application, the solution is dried either in a vacuum or by heating or by a combination of both. Heating of the coating to form aluminium phosphate, which is referred to herein as curing, may be combined with the drying stage. For example, if ethyl cellulose is used as solvent for the complex phosphate, curing and drying may be carried out at the boiling point of the solvent, which is 135° C. When, however, the solvent is removed at a temperature less than about 80° C, further heating of the coating at a temperature of at least 80° C is necessary to effect curing. Crystallisation-control additives may be incorporated in the coating solutions, for example methyl borate or ethyl silicate.

Other coatings may be applied to the coated glass, for example a resin. Glass coated with aluminium phosphate may be treated with an agent, for example an organo-silicon compound, to aid the incorporation of glass fibre in resin matrices.

Glass thus coated is considerably stronger than uncoated glass, and is resistant to abrasion. It is also more resistant to chemical attack from, for example, alkaline materials and can thus be used in contact with materials which normally damage glass, for example cement.

Forms of glass other than glass fibre may be coated as hereinbefore described, for example sheet glass and glass articles generally. Glass coated with aluminium phosphate may be further coated with a material which adheres to aluminium phosphate, for example aluminium. Glass fibre thereby coated with aluminium can readily form useful composite materials of glass fibre and aluminium, for example by compression, preferably at an elevated temperature, of a mass of coated glass fibre.

The use of complex phosphates to provide a coating of aluminium phosphate for carbon fibre is especially advantageous. The carbon fibre may, for example, be immersed in solutions of the complex phosphates in water, excess solution drained off and the fibre dried, conveniently by heating the fibre in air at temperatures from 90° C to 250° C. Optionally, the fibre may be degreased in, for example, trichloroethylene before application of the solution. The coating may be cured by heating, preferably in an inert gas, for example nitrogen, at a temperature greater than 100° C, conveniently at from 100° C to 500° C, although if drying has taken place at above about 100° C, curing is not always necessary. A coating of aluminium phosphate thus provided on carbon fibre markedly increases the resistance of the fibre to oxidation and protects the fibre surface from interaction between it and other materials with which it comes into contact. Protection may therefore be afforded to the carbon fibre when it is incorporated in materials such as molten metals, for example aluminium, to provide reinforcement for the solid metal. Coating of carbon fibre with aluminium phosphate enables the fibre to be coated further with a film of aluminium metal of glass. Composite materials may be produced by compressing "bundles" of fibres so coated, at high temperature. The coating also produces stronger bonding between the carbon fibre and a siliceous material in which it is incorporated.

The complex phosphates may be applied as a glaze or decorative coating to clay-ware or ceramic objects and are useful in general for coating any body which forms a strong bond with aluminium phosphate, although it will be understood that their use is not restricted to examples where such strong bonds are possible. Ceramic fibres may usefully be coated, for example asbestos, silicon carbide fibre and boron fibre.

Aluminium phosphate applied to metal surfaces by means of the complex phosphates provides coatings which are corrosion-resistant, heat-resistant and electrically-insulating. The coating of aluminium and steel is especially useful. Metal wires may conveniently be protected by the coatings. Corrosion inhibitors, for example glyceryl monolaurate, may be included in the coating solution.

Polymeric organic materials, for example synthetic fibres of nylon or a polyester may conveniently be coated with aluminium phosphate or a mixture comprising aluminium phosphate and an organic material. Drying and curing of the coating may be carried out by any convenient method of heating if the polymer will withstand a temperature of at least 80° C.

A solution comprising one or more of the complex phosphates may be used as an adhesive or binder for a wide variety of materials. It is especially useful as an adhesive or binder for siliceous materials, for example sand or glass; metal especially metal powders and ceramic materials generally, for example alumina or carbon. The adhesive bond may be strengthened by heating, preferably to temperatures between 200° C and 1000° C, after removal of solvent and initial curing at 100° C to 200° C of the adhesive or binder.

Strong, thermally stable and chemically inert resistant composite materials may be prepared by incorporating aligned or random fibres, for example glass fibre, carbon fibre, silicon carbide fibre or asbestos with a desired quantity of a solution of the complex phosphates in water, removal of the solvent, initial curing at 100° C to 200° C and preferably further heating, for example to a temperature of from 200° C to 1000° C.

The complex phosphates may also be used to prepare fine particles of aluminium phosphate by rapid heating of the bulk material to a temperature greater than 900° C, and grinding the resultant mass. Fine particles produced in this way may advantageously be used as a reinforcing filler in polymers such as polyvinyl chloride or they may be incorporated into molten glass as a nucleating agent in the preparation of nucleated glass.

The invention is illustrated but not limited by the following Examples:

EXAMPLE 1

40 gram of anhydrous aluminium chloride was added to 300 ml of laboratory grade ethyl alcohol. The resultant solution was cooled to 0° C and 18.6 ml of 88% orthophosphoric acid was added to it in a drop-wise manner and the reaction mixture stirred. The reaction was carried out in an atmosphere of dry nitrogen. The white crystalline material formed was separated from the mixture, washed with ethanol and dried under vacuum at a temperature of 0° C. 70 gram of product was obtained.

The product compound had the empirical formula AlPClH$_{25}$C$_8$O$_8$ and on a dry basis gave the following chemical analysis (expressed as a percentage by weight):

| Al | P | Cl | C | H |
|---|---|---|---|---|
| 7.87 | 9.04 | 10.34 | 28.03 | 7.35 | and contained 53.76% by weight of chemically-bound ethyl alcohol. The infra-red absorption spectrum of the compound containing a trace of water was measured using the liquid paraffin mull technique. The principal band positions are given in Table I which indicates the relative strengths of the bands.

| Band positions in reciprocal centimeters | | | |
|---|---|---|---|
| 3450 | strong | 970 | weak |
| 1920 | weak | 935 | weak |
| 1635 | weak | 900 | medium strong |
| 1230 | very strong | 870 | medium strong |
| 1100 | strong | 800 | weak |
| 1075 | strong | 715 | medium strong |
| 1030 | very strong | | |

A specially dried sample gave infra-red absorption spectrum band positions shown in Table II:

Table II

| Band positions in reciprocal centimeters | | | |
|---|---|---|---|
| 3450 | medium strong | 905 | strong |
| 3100 | strong | 880 | strong |
| 1235 | very strong | 660 | medium strong |
| 1110 | very strong | 625 | medium strong |
| 1095 } 1085 | medium strong | 520 | strong |
| 1045 | very strong | 390 | medium strong |

The X-ray powder data were also obtained for the compound containing a trace of water, using a Philips powder camera, CuKa radiation and a nickel filter. The intensities were obtained by visual observation. The data obtained are shown in Table III:

Table III

| X-ray powder data | | | | | |
|---|---|---|---|---|---|
| dA | I/Io | dA | I/Io | dA | I/Io |
| 10.7 | vs | 2.94 | vw | 2.097 | vvw |
| 7.2 | vw | 2.89 | vvw | 2.034 | vvw |
| 6.25 | w | 2.81 | w | 1.967 | vvw |
| 5.24 | w | 2.72 | vvw | 1.951 | vvw |
| 4.87 | w | 2.64 | vw | 1.899 | vvw |
| 4.57 | vw | 2.60 | vvw | 1.866 | vvw |
| 4.04 | m | 2.54 | vvw | 1.786 | vvw |
| 3.62 | s | 2.489 | vw | 1.660 | vvw |
| 3.44 | s | 2.460 | vvw | 1.627 | vvw |
| 3.25 | vvw | 2.279 | vw | 1.594 | vvw |
| 3.18 | vw | 2.236 | vvw | 1.553 | vvw |
| 3.11 | vvw | 2.174 | vvw | 1.528 | vvw |
| 3.02 | w | 2.132 | vvw | | | s = strong;
v = very;
w = weak;
m = medium

A differential thermal analysis was carried out on a sample of the compound which contained a small quantity of water. The thermogram covered the range 0°–800° C and was carried out under nitrogen. Sharp endothermic peaks at 82° C and 96° C and a broad endothermic inflection at approximately 175° C were observed.

10 gram of the compound was placed in a tray to a depth of ¼-inch and left for 6 days at a temperature of 20° C and in a relative humidity of 75%. The resultant amorphous product contained 0.1% of weight of chemically-bound ethyl alcohol and 35.1% by weight of chemically-bound water. The compound contained 11.32% by weight of aluminium, 12.70% by weight of phosphorus and 11.84% by weight of chlorine.

EXAMPLE 2

300 gram of the compound AlPClH$_{25}$C$_8$O$_8$ prepared as described in Example 1 was placed in a 4-inch diameter tube fitted with a No. 02 glass sinter near its base. Compressed air was blown through the compound at a rate of 20 liters per hour for 92 hours. A dry amorphous powder was formed containing 12.4% by weight of aluminium, 11.6% by weight of chlorine, 14.5% by weight of phosphorus and 30% by weight of chemically-bound water.

A differential thermal analysis of a sample was carried out. The thermogram showed two endothermic peaks at about 108° C and 160° C.

EXAMPLE 3

15.2 gram of anhydrous aluminium chloride was added slowly to 40 ml of distilled water. The resultant solution was cooled to ambient temperature and 7.4 ml of an 88% solution of orthophosphoric acid added to it with stirring. The solution was then concentrated by heating to a volume of about 20 ml. A viscous yellow-brown liquid was formed which, after several days' standing in a crystallising dish, produced a crop of crystals. The crystals were filtered off, washed with ethanol and dried in a vacuum desiccator. The chemical analysis of the crystals gave aluminium 10.6% by weight, chlorine 14.5% by weight, phosphorus 12.4% by weight, water 40.1% by weight. This analysis corresponded well with the empirical formula AlPClH$_{11}$O$_9$. The X-ray powder pattern was obtained for the crystals using a Philips powder camera, CuKa radiation and a nickel filter. The intensities were obtained by visual observation, and the data are shown in Table IV:

Table IV

| Intensity | Value |
|---|---|
| s | 9.20 |
| vw | 7.31 |
| w | 6.68 |
| vw | 5.78 |
| vvw | 5.50 |
| vw | 5.02 |
| wm | 4.55 |
| w | 4.24 |
| w | 4.08 |
| wm | 3.931 |
| w+ | 3.705 |
| w− | 3.504 |
| w | 3.411 |
| w | 3.276 |
| w+ | 3.184 |
| w+ | 3.123 |
| m | 3.030 |
| m− | 2.966 |
| w | 2.886 |
| w | 2.824 |
| w− | 2.676 |
| w− | 2.600 |
| w+ | 2.427 |
| w | 2.263 |
| w | 2.225 |
| vw | 2.141 |
| m | 2.094 |
| vw | 2.062 |
| vw | 2.023 |

Table IV-continued

| Intensity | Value |
|---|---|
| w— | 1.979 |
| w | 1.914 |
| vw | 1.850 |
| wm | 1.819 | s = strong;
v = very;
w = weak;
m = medium

What we claim is:

1. A solid water-soluble inorganic halogen-containing complex phosphate of aluminum wherein the ratio of the number of gram atoms of aluminum to the number of gram atoms of phosphorus is substantially 1:1, the ratio of the number of gram atoms of aluminum to the number of gram atoms of halogen is substantially 1:1, and which contains at least one chemically-bound molecule of water.

2. A complex phosphate as claimed in claim 1 wherein the halogen is chlorine.

3. A complex phosphate as claimed in claim 1 which contains from 1 to 5 molecules of water.

4. A complex phosphate as claimed in claim 3 which contains 4 molecules of water.

5. A complex phosphate as claimed in claim 1 having the empirical formula $AlPClH_{11}O_9$.

6. A method of preparing a complex phosphate as claimed in claim 1 comprising the steps of interacting aluminum or an aluminum compound selected from halides, alkoxy halides, oxyhalides, hydroxides and alkoxides with water and phosphoric acid or a compound capable of forming phosphoric acid under the reaction conditions and, when aluminum or an aluminum compound other than a halide is used, with a halogen acid, and separating the complex phosphate as a solid product, the reaction being effected at a temperature below 60° C. and at a ratio of the number of gram atoms of aluminum to the number of gram atoms of phosphorus being substantially 1:1.

7. A method as claimed in claim 6 wherein the aluminum compound is aluminum chloride.

* * * * *